(12) United States Patent
Parrella et al.

(10) Patent No.: US 11,359,338 B2
(45) Date of Patent: Jun. 14, 2022

(54) CONSTRUCTION PRODUCTS AND SYSTEMS FOR PROVIDING GEOTHERMAL HEAT

(71) Applicant: EXOTEX, INC., Westport, CT (US)

(72) Inventors: Michael J. Parrella, Weston, CT (US); Nevil R. Ede, Westport, CT (US)

(73) Assignee: EXOTEX, INC., Houston, TX (US)

( * ) Notice: Subject to any disclaimer, the term of this patent is extended or adjusted under 35 U.S.C. 154(b) by 27 days.

(21) Appl. No.: 15/756,732

(22) PCT Filed: Sep. 1, 2016

(86) PCT No.: PCT/US2016/049843
§ 371 (c)(1),
(2) Date: Mar. 1, 2018

(87) PCT Pub. No.: WO2017/040753
PCT Pub. Date: Mar. 9, 2017

(65) Prior Publication Data
US 2018/0245293 A1 Aug. 30, 2018

Related U.S. Application Data

(60) Provisional application No. 62/212,734, filed on Sep. 1, 2015.

(51) Int. Cl.
*E01C 11/26* (2006.01)
*F24D 3/14* (2006.01)
(Continued)

(52) U.S. Cl.
CPC .............. *E01C 11/26* (2013.01); *E04D 13/03* (2013.01); *F24D 3/12* (2013.01); *F24D 3/14* (2013.01);
(Continued)

(58) Field of Classification Search
CPC ........ E01C 11/26; E01C 13/03; E01C 13/103; F24D 3/14; F24D 3/12; F24D 3/147;
(Continued)

(56) References Cited

U.S. PATENT DOCUMENTS 3,195,619 A * 7/1965 Tippman ................. E01C 11/26
159/902
3,217,791 A * 11/1965 Long ....................... E02D 3/115
165/45

(Continued)

FOREIGN PATENT DOCUMENTS

EP  1529880  5/2005
JP  8284106  10/1996
(Continued)

*Primary Examiner* — Ljiljana V. Ciric
(74) *Attorney, Agent, or Firm* — Ware, Fressola, Maguire & Barber LLP

(57) ABSTRACT

A geothermal heat delivery system supplies geothermal heat for various residential, surface heating applications, including heating driveways, paths, sidewalks, homes, roofs, swimming pools, and commercial applications, including heating roadways, parkways, highways, airport runways, parking lots and sidewalks. The geothermal heat delivery system includes a series of heat pipes that are used to provide geothermal heat from a borehole to a structure or a surface, which can for example, melt precipitation on a road, driveway or roof, without the use of a ground source heat pump.

14 Claims, 6 Drawing Sheets

(51) Int. Cl.
　　　*F24D 3/12*　　　(2006.01)
　　　*E04D 13/03*　　　(2006.01)
　　　*F24T 10/30*　　　(2018.01)
　　　*F24T 10/40*　　　(2018.01)
　　　*E04D 13/10*　　　(2006.01)
　　　*F28D 15/02*　　　(2006.01)

(52) U.S. Cl.
　　　CPC .............. *F24D 3/147* (2013.01); *F24T 10/30* (2018.05); *F24T 10/40* (2018.05); *E04D 13/103* (2013.01); *F24D 2200/11* (2013.01); *F24D 2220/07* (2013.01); *F28D 15/02* (2013.01); *F28D 15/0266* (2013.01); *Y02B 10/40* (2013.01); *Y02B 30/00* (2013.01); *Y02E 10/10* (2013.01)

(58) Field of Classification Search
　　　CPC .. F24D 15/02; F24D 15/0266; F24D 2200/11; F24D 2220/07; F24T 10/30; F24T 10/40; Y02E 10/10; Y02B 10/40; Y02B 30/24
　　　See application file for complete search history.

(56) References Cited

U.S. PATENT DOCUMENTS

| | | | | |
|---|---|---|---|---|
| 3,683,152 | A * | 8/1972 | Laing | E01C 11/26 165/104.19 |
| 3,771,590 | A * | 11/1973 | Best | E21B 36/003 165/45 |
| 3,828,845 | A * | 8/1974 | Waters | F24T 10/30 165/185 |
| 3,875,996 | A * | 4/1975 | Von Kohorn | F24F 3/044 165/45 |
| 3,902,547 | A * | 9/1975 | Waters | E02D 3/115 165/185 |
| 3,935,900 | A * | 2/1976 | Waters | E02D 27/35 165/45 |
| 4,009,418 | A * | 2/1977 | Bennett | F28D 15/0275 174/15.2 |
| 4,040,480 | A * | 8/1977 | Richards | G21F 5/10 166/57 |
| 4,050,509 | A * | 9/1977 | Bienert | F24T 10/30 165/45 |
| 4,138,995 | A * | 2/1979 | Yuan | F28D 15/0233 126/400 |
| 4,162,394 | A * | 7/1979 | Faccini | F24S 10/95 392/386 |
| 4,240,268 | A * | 12/1980 | Yuan | F24F 5/0046 126/400 |
| 4,254,821 | A * | 3/1981 | Matsuda | F28D 15/04 165/47 |
| 4,258,780 | A * | 3/1981 | Suo | F28D 15/02 165/45 |
| 4,279,294 | A * | 7/1981 | Fitzpatrick | F24T 10/40 165/45 |
| 4,305,681 | A * | 12/1981 | Backlund | F24S 20/64 165/47 |
| 4,339,929 | A * | 7/1982 | Fitzpatrick | F24T 10/10 165/45 |
| 4,444,249 | A * | 4/1984 | Cady | F28D 15/0233 126/629 |
| 4,566,527 | A * | 1/1986 | Pell | E01C 11/26 165/45 |
| 4,644,750 | A * | 2/1987 | Lockett | F24T 10/30 60/641.2 |
| 4,662,105 | A * | 5/1987 | LaGow | A01G 13/06 47/2 |
| 4,685,867 | A * | 8/1987 | Patun | F04D 29/5893 310/87 |
| 4,693,301 | A | 9/1987 | Baehrle et al. | |
| 4,798,239 | A * | 1/1989 | Persohn | E03B 7/12 165/47 |
| 4,851,183 | A * | 7/1989 | Hampel | F28D 15/00 376/274 |
| 4,917,173 | A * | 4/1990 | Brown | F28D 15/0233 122/366 |
| 4,921,041 | A * | 5/1990 | Akachi | F28D 15/00 165/104.14 |
| 5,054,297 | A * | 10/1991 | Furuhama | F24F 5/0017 165/45 |
| 5,062,736 | A * | 11/1991 | Katsuragi | E01C 11/26 165/45 |
| 5,081,848 | A | 1/1992 | Rawlings et al. | |
| 5,178,485 | A * | 1/1993 | Katsuragi | E01C 11/26 165/45 |
| 5,238,053 | A * | 8/1993 | Long | F28D 15/0233 165/45 |
| 5,477,703 | A * | 12/1995 | Hanchar | F24T 10/30 62/260 |
| 5,845,702 | A * | 12/1998 | Dinh | F24F 3/1405 165/104.21 |
| 6,041,862 | A * | 3/2000 | Amerman | F25B 30/06 166/57 |
| 6,129,141 | A * | 10/2000 | Yang | A61K 9/0031 165/45 |
| 6,250,371 | B1 * | 6/2001 | Amerman | F28D 20/0052 165/47 |
| 6,450,247 | B1 * | 9/2002 | Raff | F24F 5/0046 165/45 |
| 7,115,227 | B2 * | 10/2006 | Mucciardi | F28D 15/0266 266/225 |
| 7,435,037 | B2 * | 10/2008 | McKinzie, II | E21B 36/04 405/130 |
| 7,856,839 | B2 | 12/2010 | Wiggs | |
| 7,878,691 | B2 * | 2/2011 | Liang | F21S 8/086 362/153.1 |
| 9,288,932 | B2 * | 3/2016 | Campbell | H05K 7/2039 |
| 9,351,430 | B2 * | 5/2016 | James | H05K 7/20827 |
| 9,512,677 | B2 * | 12/2016 | Shimko | E21B 41/0035 |
| 9,952,000 | B1 * | 4/2018 | Weyant | F28D 15/046 |
| 2002/0036076 | A1 * | 3/2002 | Eastman | F28D 20/0052 165/45 |
| 2006/0276552 | A1 * | 12/2006 | Barbut | A61M 11/06 514/743 |
| 2007/0017243 | A1 * | 1/2007 | Kidwell | H01Q 1/02 62/260 |
| 2007/0023163 | A1 * | 2/2007 | Kidwell | F28D 15/0233 165/45 |
| 2007/0205298 | A1 * | 9/2007 | Harrison | F24D 11/0221 237/2 B |
| 2008/0053130 | A1 * | 3/2008 | Mueller | F24F 5/0046 62/260 |
| 2009/0107650 | A1 * | 4/2009 | Feldmann | F24T 10/15 165/45 |
| 2009/0189617 | A1 * | 7/2009 | Burns | E21B 36/04 324/649 |
| 2009/0277602 | A1 * | 11/2009 | Yang | F24T 10/10 165/45 |
| 2009/0308566 | A1 * | 12/2009 | Simka | F24F 5/005 165/45 |
| 2010/0000233 | A1 * | 1/2010 | Groothuis | F17C 5/06 62/50.2 |
| 2010/0089584 | A1 * | 4/2010 | Burns | H01C 3/00 166/302 |
| 2010/0218496 | A1 * | 9/2010 | Miles | F24S 10/90 60/517 |
| 2010/0224234 | A1 | 9/2010 | Fischer | |
| 2010/0258265 | A1 * | 10/2010 | Karanikas | E21B 36/04 165/45 |
| 2013/0167530 | A1 | 7/2013 | Hsieh et al. | |
| 2013/0299123 | A1 | 11/2013 | Matula | |
| 2014/0105439 | A1 * | 4/2014 | Wirth | H04R 1/00 381/338 |
| 2015/0007960 | A1 * | 1/2015 | Kawano | F24T 10/10 165/45 |
| 2015/0107243 | A1 * | 4/2015 | Parrella, Sr. | F03D 13/20 60/641.2 |

(56) References Cited

U.S. PATENT DOCUMENTS

| | | | |
|---|---|---|---|
| 2015/0163965 A1* | 6/2015 | Parrella | F24T 10/10 |
| | | | 361/700 |
| 2015/0211803 A1* | 7/2015 | Edwards | F28D 15/0275 |
| | | | 165/104.21 |
| 2015/0292774 A1* | 10/2015 | Kang | F24T 10/30 |
| | | | 165/45 |
| 2015/0377522 A1* | 12/2015 | Ziegenfuss | F24T 10/15 |
| | | | 165/45 |
| 2016/0045841 A1* | 2/2016 | Kaplan | C10J 3/72 |
| | | | 429/49 |
| 2017/0248345 A1* | 8/2017 | Parrella | F24T 10/30 |
| 2018/0224215 A1* | 8/2018 | Thiers | F24T 10/13 |
| 2018/0245293 A1* | 8/2018 | Parrella | F24D 3/14 |

FOREIGN PATENT DOCUMENTS

| | | |
|---|---|---|
| JP | 2001081712 | 3/2001 |
| JP | 2004052385 | 2/2004 |
| JP | 2007177490 | 7/2007 |
| JP | 2008088652 | 4/2008 |

* cited by examiner

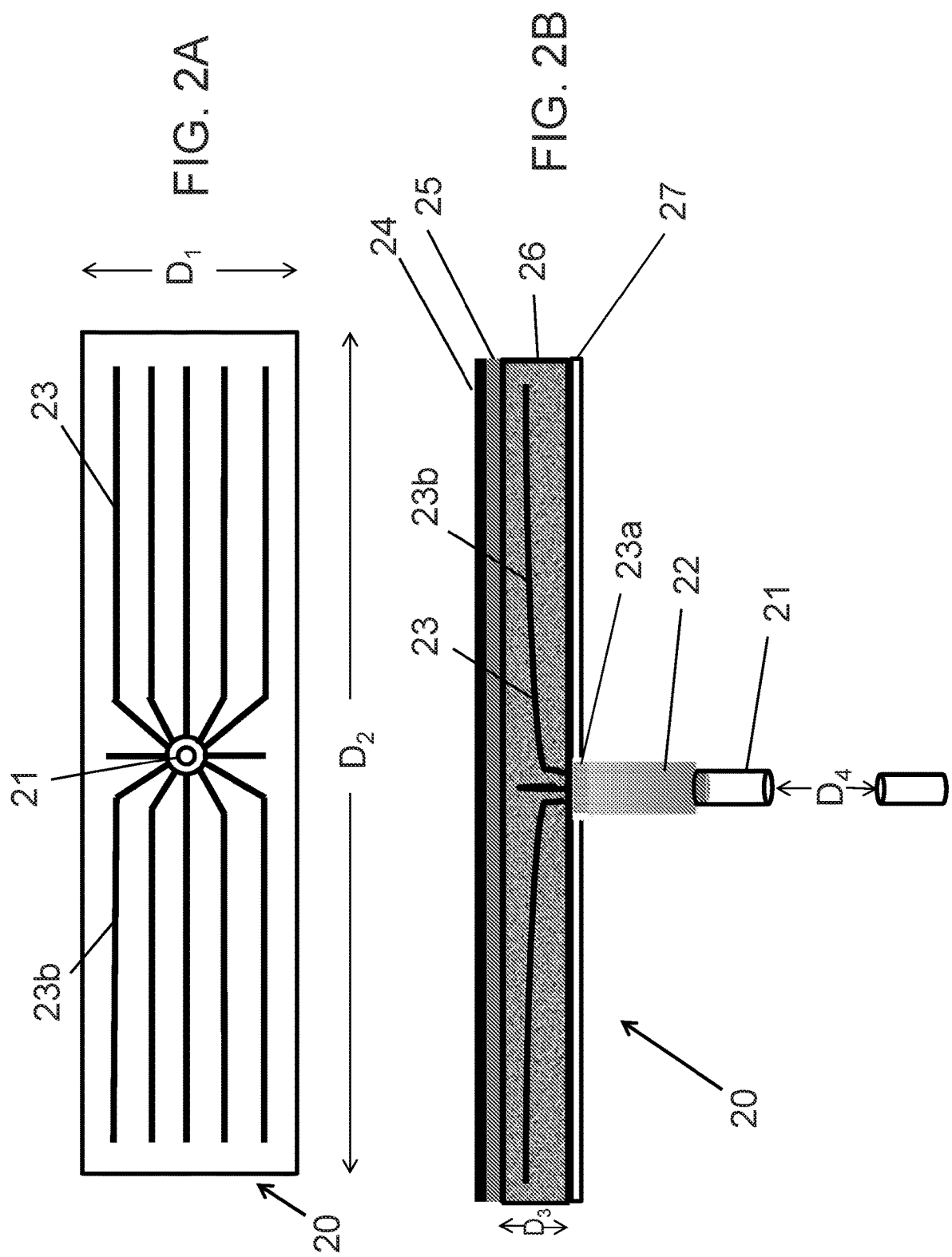

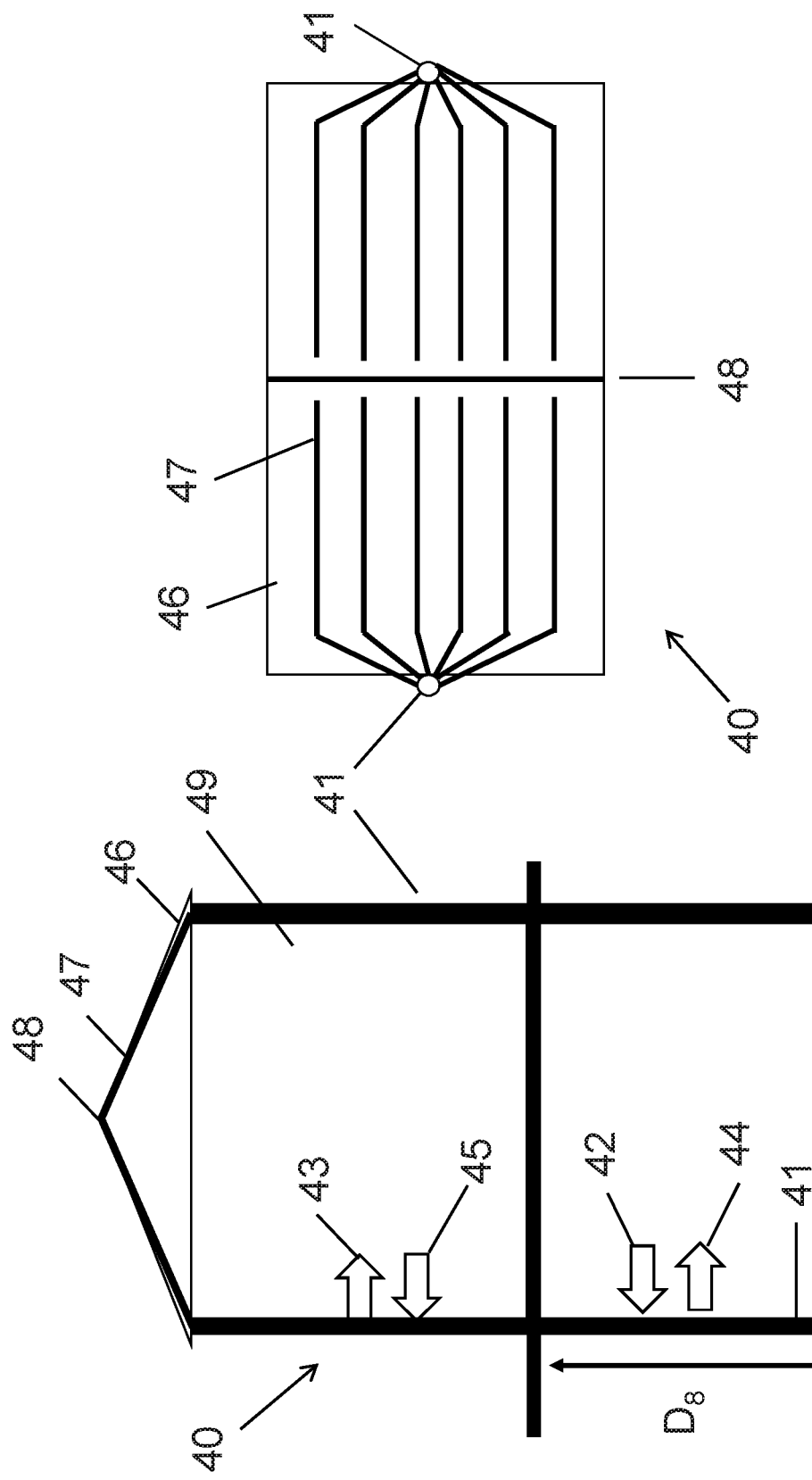

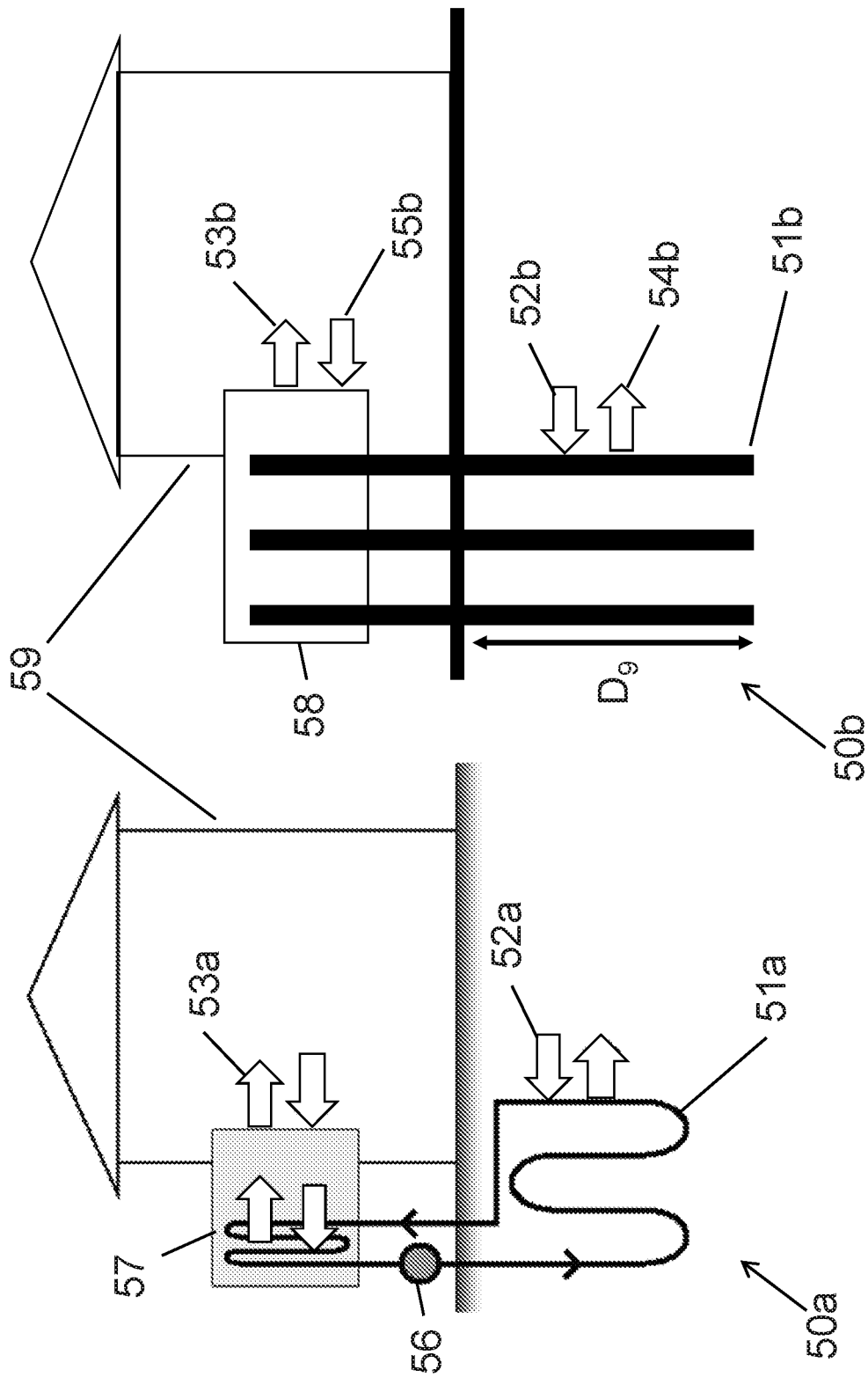

CONSTRUCTION PRODUCTS AND SYSTEMS FOR PROVIDING GEOTHERMAL HEAT

CROSS-REFERENCE TO RELATED APPLICATIONS

The present application claims the benefit of U.S. Provisional Patent Application No. 62/212,374, filed on Sep. 1, 2015, which is hereby incorporated by reference in its entirety.

BACKGROUND OF THE INVENTION

As many areas have seen increasing amounts of snow in recent years, a greater need has arisen to prevent the accumulation of snow before it causes damage or becomes too substantial to remove easily.

A number of technologies have been created to address this problem. For example, underground electric coils can be installed beneath a road or driveway, which receive electricity to generate heat, which melts precipitation on the surface. However, such systems can be very costly to operate and require a significant amount of energy. For example, in typical electric coil systems, the annual cost of heating a 400 sq. ft. slab is $397 (areas with lighter snowfall) to $1,003 (areas with moderate to heavy snowfall) based upon a delivered cost (generation, transmission, taxes, etc.) of 25¢ per kwh. (Source: ConcreteNetwork.com). Another proposed solution involves pumping a fluid into coils beneath the surface. However, this also requires a significant energy input to run the system. Furthermore, these technologies involve many parts that are subject to malfunction and require maintenance. The systems are not able to operate for extensive periods without supervision to avoid the system malfunctioning and creating a safety hazard.

What is needed therefore is a system that can safely operate to generate heat that can melt surface precipitation, without also requiring a significant energy and cost input.

SUMMARY OF THE INVENTION

The present invention addresses these shortcomings in the art by providing a system for providing geothermal heat to a surface or a structure.

The present invention includes one or more heat pipes for providing geothermal heat to the surface or structure. In a preferred embodiment, the heat pipes used in the systems according to the present invention are constructed from durable fiber-reinforced composite materials, which can incorporate a wide variety of performance attributes suitable for use in residential and commercial applications.

The geothermal heat delivery system can be used in systems providing various residential applications, including heating driveways, paths, sidewalks, homes, roofs and swimming pools. The geothermal heat delivery system can be used in systems providing various commercial applications, including roadways, parkways, highways, airport runways, parking lots and sidewalks.

Unlike a conventional ground source heat pump, the heat pipes used in the present invention rely solely on geothermal energy to operate, and require no additional energy input to move heat to the surface. The heat pipes also have no moving parts that would require maintenance. The heat pipes are designed to last the lifetime of the home, buildings, roads, driveways, parking areas and sidewalks or pathways.

In accordance with a first aspect of the invention, a system for providing geothermal heat to an outdoor surface is provided. The system comprises at least one borehole heat pipe inserted into a borehole. The at least one borehole heat pipe comprises a vacuum sealed container comprising an operating fluid, a first end comprising an evaporation section and a second end comprising a condensation section. The evaporation section of the at least one borehole heat pipe is configured to absorb geothermal heat and convert the operating fluid from liquid to vapor, such that the vapor flows to the second end of the borehole heat pipe. The condensation section is configured to release the geothermal heat from the vapor and convert the operating fluid from vapor to liquid. The system further comprises a plurality of surface heat pipes each having a base section and a heat transfer section. The base sections of the plurality of surface heat pipes surround the second end of the borehole heat pipe and are configured to absorb the geothermal heat released by the condensation section of the at least one borehole heat pipe, and the heat transfer sections are positioned beneath the outdoor surface and configured to transfer the geothermal heat to the outdoor surface.

In accordance with the first aspect of the invention, the system further comprises a heat manifold comprising an outer casing that surrounds the base sections of the plurality of surface heat pipes and the second end of the at least one borehole heat pipe. The heat manifold further comprises a conductive material filling spaces between the outer casing, the plurality of surface heat pipes and the at least one borehole heat pipe.

In accordance further with the first aspect of the invention, each of the plurality of surface heat pipes comprises a vacuum sealed container comprising an operating fluid, a first end in the base section comprising an evaporation section, and a second end in the heat transfer section comprising a condensation section. The evaporation section of each of the plurality of surface heat pipes is configured to absorb geothermal heat from the at least one borehole heat pipe and convert the operating fluid from liquid to vapor, such that the vapor flows to the second end of the respective each of the plurality of surface heat pipes. The condensation section of each of the plurality of surface heat pipes is configured to release the geothermal heat from the vapor and convert the operating fluid from vapor to liquid.

In accordance further with an embodiment of the first aspect of the invention, the outdoor surface comprises an asphalt or concrete layer comprising asphalt or concrete combined with at least one additional material configured to increase the heat retention ability of the asphalt or concrete. The heat transfer sections of the plurality of surface heat pipes are positioned in a filler layer positioned beneath the asphalt or concrete layer and comprising one or more materials having heat conductive properties, wherein the filler layer is configured to transfer heat from the plurality of surface heat pipes to the asphalt or concrete layer of the outdoor surface. The system may further comprise an intermediate level formed of a heat conductive concrete material positioned in between the filler layer and the asphalt or concrete layer, and a base layer formed of concrete positioned beneath the filler layer.

In accordance further with an embodiment of the system of the first aspect of the invention, the heat transfer sections of the plurality of surface heat pipes project away from the at least one borehole heat pipe in a plurality of directions around the at least one borehole heat pipe. In accordance further with an embodiment of the system of the first aspect of the invention, the borehole has a depth of between 200 and 300 feet.

In accordance with one embodiment of the system of the first aspect of the invention, the outdoor surface is a road. In accordance with a further embodiment of the system of the first aspect of the invention, the outdoor surface is a driveway. In accordance with a further embodiment of the system of the first aspect of the invention, the outdoor surface is a roof of a structure.

The system according to the first aspect of the invention may further comprise a second borehole heat pipe inserted into a second borehole. The second borehole heat pipe comprises a vacuum sealed container comprising an operating fluid, a first end comprising an evaporation section, and a second end comprising a condensation section. The evaporation section of the second borehole heat pipe is configured to absorb geothermal heat and convert the operating fluid from liquid to vapor, such that the vapor flows to the second end of the second borehole heat pipe. The condensation section is configured to release the geothermal heat from the vapor and convert the operating fluid from vapor to liquid. The system according to this embodiment may further comprise a second plurality of surface heat pipes each having a base section and a heat transfer section. The base sections of the second plurality of surface heat pipes surround the second end of the second borehole heat pipe and are configured to absorb the geothermal heat released by the condensation section of the second borehole heat pipe. The heat transfer sections are positioned beneath the outdoor surface and configured to transfer the geothermal heat to the outdoor surface. In accordance with this embodiment of the system of the first aspect of the invention, the outdoor surface may be a roof of a structure. The first and second borehole heat pipes may be positioned on opposing sides of the structure and the heat transfer sections of the first and second plurality of surface heat pipes are placed beneath an exterior surface of the roof and extend towards a center of the roof.

In accordance with a second aspect of the invention, a system for heating or cooling a structure is provided. The system may comprise at least one heat pipe inserted into a borehole. The at least one heat pipe comprises a vacuum sealed container comprising an operating fluid, a first end comprising an evaporation section and a second end comprising a condensation section. The evaporation section of the at least one heat pipe is configured to absorb heat and convert the operating fluid from liquid to vapor, such that the vapor flows to the second end of the heat pipe. The condensation section is configured to release the heat from the vapor and convert the operating fluid from vapor to liquid. The system further comprises a heat exchanger configured to exchange heat between the at least one heat pipe and an interior of the structure. When the evaporation section of the at least one heat pipe is positioned at a base of the borehole, the evaporation section is configured to absorb geothermal heat and is configured to convert the operating fluid from liquid to vapor, such that the vapor flows to the condensation end of the heat pipe, and wherein the condensation section is configured to release the heat from the vapor to the heat exchanger, and convert the operating fluid from vapor to liquid. When the evaporation section of the at least one heat pipe is positioned in the heat exchanger, the evaporation section is configured to absorb heat from the interior of the structure from the heat exchanger and is configured to convert the operating fluid from vapor to liquid, and the liquid flows to the condensation section of the heat pipe, and wherein the condensation section is configured to release the heat from the vapor to ground surrounding the borehole, and convert the operating fluid from vapor to liquid. The position of the evaporation section and the condensation section of the at least one heat pipe is configured to vary depending on the atmospheric temperature. The system according to the second aspect of the invention may further comprise a plurality of heat pipes extending into a plurality of boreholes.

BRIEF DESCRIPTION OF THE FIGURES

FIG. 2A shows an overhead view of a geothermal driveway heating system in accordance with an embodiment of the present invention.

FIG. 2B shows a side view of a geothermal driveway heating system in accordance with an embodiment of the present invention.

FIG. 5A shows a side view of a geothermal roof heating system in accordance with an embodiment of the present invention.

FIG. 5B shows an overhead view of a geothermal roof heating system in accordance with an embodiment of the present invention.

FIG. 6A shows a side view of a conventional ground source heat pump system for home heating.

FIG. 6B shows a side view of a geothermal home heating system in accordance with an embodiment of the present invention.

DETAILED DESCRIPTION OF THE FIGURES

The system according to the present invention will now be described, with reference made to FIGS. 1-6B.

Figure 1:
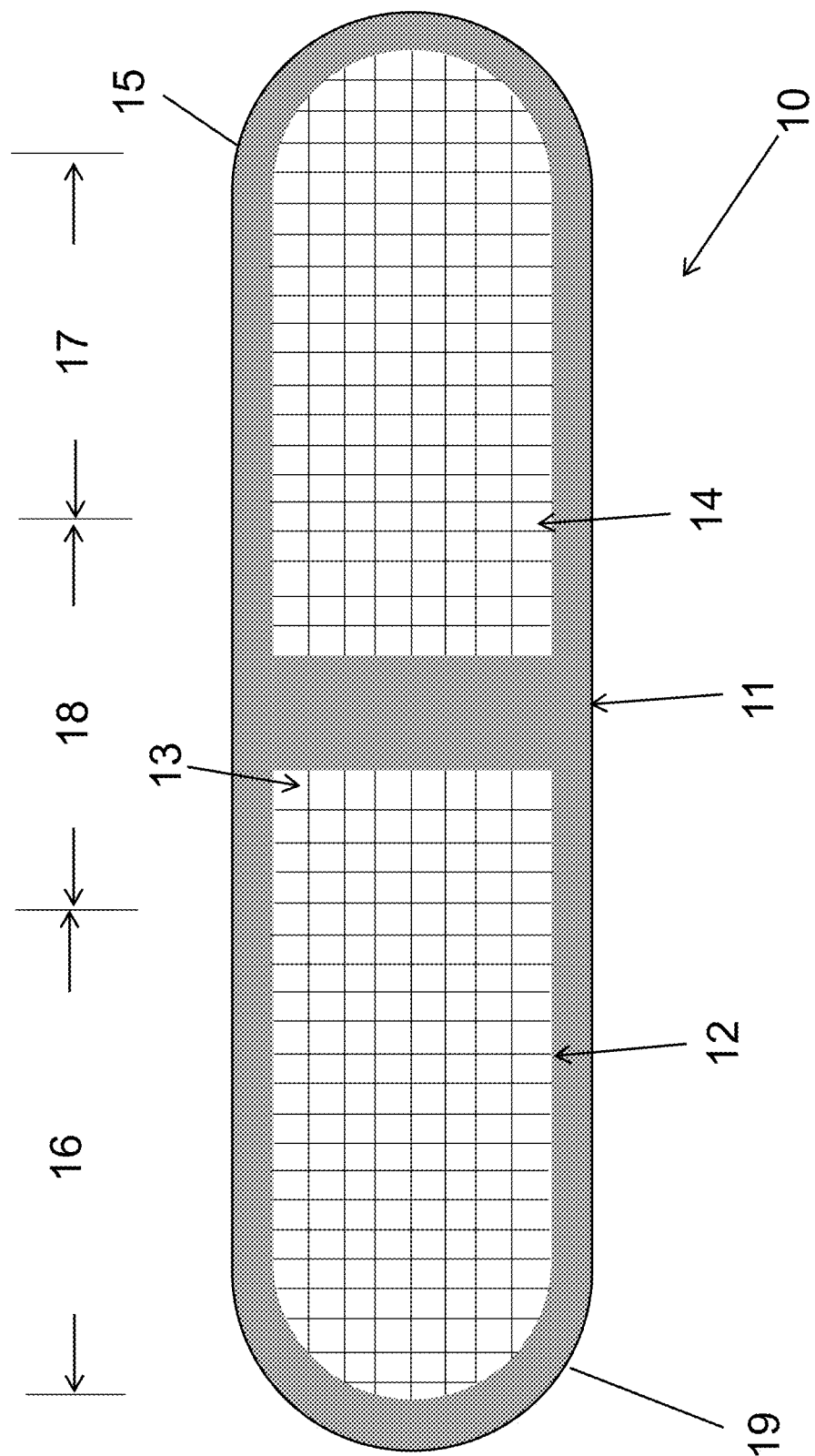
FIG. 1 shows a diagram of a heat pipe.

In accordance with the present invention, multiple heat pipe elements are provided to supply geothermal heat from a borehole to a surface or structure. FIG. 1 shows a heat pipe 10, as used in the systems of the present invention. The heat pipe 10 contains an operating fluid 12 that operates in a vacuum sealed container 11. Each heat pipe 10 is self-contained. The heat pipe 10 includes a condensation section 16 at a first end 19 of the heat pipe 10, and an evaporation section 17 at a second end 15 of the heat pipe 10. As the temperature rises at the second end 15 of the heat pipe 10, the condensed operating fluid 12 turns to a vapor 13, which absorbs the latent heat from the surroundings of the heat pipe 10. The hot vapor within the heat pipe 10 flows through an adiabatic section 18 of the heat pipe 10 to the cooler, first end 19 of the heat pipe 10 having the condensation section 16, where the vapor condenses and releases the latent heat to the surroundings of the heat pipe 10. The condensed fluid then flows back to the hotter, second end 15 of the heat pipe 10 and the process repeats itself. The heat pipe 10 is slanted at a minimum angle of three degrees to facilitate the condensate returning to the bottom end 19 of the heat pipe 10. This transfer of heat takes place in only a few seconds. Conversely, when the heat source is removed, the heat pipe 10 cools in only a few seconds. The heat pipe 10 may also comprise a wicking structure 14. The wicking structure 14 includes a treatment of the interior surface of the heat pipe 10. This treatment can be applied either by cutting lengthwise grooves along the interior or by adding a wicking material to the interior surface. Each approach uses capillary force to cause liquid flow toward a region of no liquid (such as the evaporation section 17 of the heat pipe 10) regardless of the orientation of the heat pipe 10 relative to gravity. Many types of organic fluids can be used as the operating fluid 12 in the heat pipe 10. Preferably, the operating fluid 12 has a low vapor pressure at temperatures near ambient conditions (between −40 to 120° F.). Other types of fluids, such as water, can be used as the operating fluid 12 in situations where higher temperature environments are being addressed.

In accordance with the present invention, the heat pipes can be efficiently used for a variety of commercial and residential applications, including but not limited to heating driveways, heating pathways, heating roofs, home heating, heating swimming pools, green houses and pre-heating water.

In accordance with one embodiment of the present invention, a geothermal driveway heating system 20 is provided, as shown in FIGS. 2A and 2B. The geothermal driveway heating system 20 may be used in periods of cold weather to provide heat to a driveway in order to prevent the accumulation or formation of snow and ice on the driveway.

The geothermal driveway heating system 20 comprises a borehole heat pipe 21 inserted into a borehole in the ground. A heat manifold 22 surrounds an upper portion of the borehole heat pipe 21, beneath the driveway surface. A plurality of surface heat pipes 23 extend from the heat manifold 22, which provide heat to a surface, which in this embodiment of the present invention is a driveway surface. The surface heat pipes 23 project upward from the heat manifold 22 and extend radially in a plurality of directions from the centrally positioned borehole heat pipe 21 and heat manifold 22 beneath the driveway surface, as shown for example in FIG. 2A. The surface heat pipes 23 include a base section 23a, which is positioned inside the heat manifold 22. The base sections 23a of the surface heat pipes 23 surround the perimeter of the borehole heat pipe 21, as shown for example in FIG. 3A. The base section 23a includes the evaporation section of the surface heat pipe 23. The surface heat pipes 23 also each include a heat transfer section 23b, which extends from the base section 23a, out of the heat manifold 22. The heat transfer section 23b includes the condensation section of the surface heat pipe 23. The surface heat pipes 23 can be bent or angled in between the base sections 23a and the heat transfer sections 23b in various horizontal or vertical directions in a manner that will substantially evenly disperse the heat generated from the surface heat pipes 23 over the area of the driveway surface, which may be square, rectangular, circular or any other shape. In the example shown in FIG. 2A, the driveway surface has a width ($D_1$) of ten feet and a length ($D_2$) of forty feet, but the present invention is not limited to use with surfaces having such dimensions. The heat manifold 22 that connects the surface heat pipes 23 and with the borehole heat pipe 21 does not need to be circular in cross section or cylindrical, but in alternative embodiments, can have different shapes within the structural limits of the environment and working fluid.

In the embodiment of the invention shown in FIG. 2B, the driveway comprises multiple layers of material to maximize heat transfer and retention. The driveway surface of the geothermal driveway heating system 20 may comprise a top-most layer 24 of asphalt or concrete. The asphalt or concrete may be mixed with one or more additive compounds in order to improve the heat absorption and retention properties of the asphalt or concrete, so as to most efficiently melt precipitation falling on the top-most layer 24. The addition of high conductivity material to the driveway surface material enhances performance. Beneath the top-most layer 24, an intermediate heat conductive layer 25 may also be provided to conduct heat generated from the surface heat pipes 23 to the top-most asphalt or concrete layer 24. In certain embodiments, the intermediate heat conductive layer 25 is of a heat conductive concrete material and can be approximately three inches thick. A filler layer 26 is provided beneath the intermediate heat conductive layer 25 and top-most layer 24. The heat transfer sections 23b of the surface heat pipes 23 extend out of the heat manifold 22 into the filler layer 26. The filler layer 26 may include a mixture of chopped fiber and aggregate fill, which have heat conductive properties. In the embodiment shown in FIG. 2B, the filler layer 26 has a thickness ($D_3$), which can be between one and a half and two feet. The heat from surface heat pipes 23 passes through the filler layer 26 towards the top-most layer 24 to supply the heat to the driveway needed to melt snow and ice, or prevent its initial formation. High conductivity materials may be included in the filler layer 26 that can flow easily to make thermally effective solid-to-solid thermal contact. The top-most layer 24, the heat conductive layer 25 and the filler layer 26 each have different purposes and would have different structural, wear, and heat transfer requirements and trade-offs. The top-most layer 24 must give good wear resistance while having the highest possible conductivity. The heat conductive layer 25 provides very high conductivity and high compressive load bearing characteristics. The filler layer 26 provides high thermal conductivity and good material to heat pipe surface "wetting" characteristics to maximize heat transfer. Beneath the filler layer 26, a base layer 27 may be provided. The base layer 27 may be a slab of concrete, which adds to the stability and durability of the driveway. The base layer 27 also provides insulation between the filler layer 26 being heated by the surface heat pipes 23, and the ground, which at such a depth near the surface, may be colder than the heated filler layer 26.

In the geothermal driveway heating system 20, the borehole heat pipe 21 and heat manifold 22 are installed beneath the ground surface. The borehole heat pipe 21 may have a length ($D_4$) between 200 and 300 feet. A borehole can be drilled into the ground to receive the borehole heat pipe 21. The ground into which the borehole heat pipe 21 is inserted may provide a heat source that is between 55° F. and 70° F. As the depth of the borehole increases, the temperature of surrounding area also increases. At the base of the borehole heat pipe 21, where the ground temperature is highest, the condensed fluid in the borehole heat pipe 21 converts to a vapor form and rises up the borehole heat pipe 21 towards the heat manifold 22.

Figure 3B:
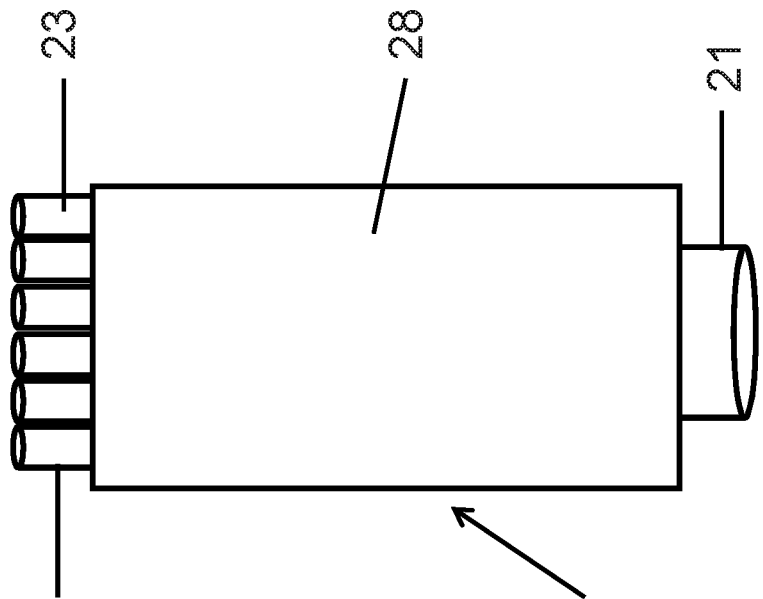
FIG. 3B shows a side view of a heat manifold of a geothermal driveway heating system in accordance with an embodiment of the present invention.
Figure 3A:
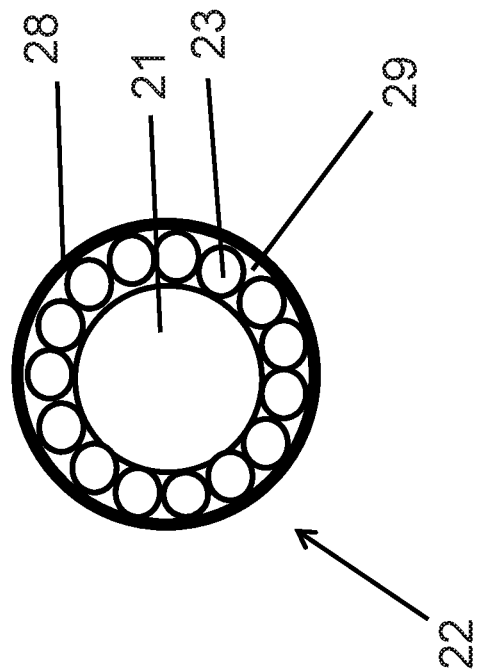
FIG. 3A shows a cross-sectional view of a heat manifold of a geothermal driveway heating system in accordance with an embodiment of the present invention.

As seen in FIGS. 3A and 3B, the top-most portion of the borehole heat pipe 21 is oriented in the center of the heat manifold 22. A series of surface heat pipes 23 surround the borehole heat pipe 21 within the heat manifold 22. In the embodiments shown in FIGS. 2A-3B, between twelve and fifteen surface heat pipes 23 are provided, however, the number of surface heat pipes 23 included in a geothermal driveway heating system 20 and required for adequately melting precipitation on the driveway may vary in other embodiments. The lengths of the surface heat pipes 23 may vary depending on the temperature of the environment, the diameter of the heat pipe, and the working fluid used. The lengths of the surface heat pipes 23 can range from several inches to several hundred feet long and may vary depending on the particular implementation of the system. The number of surface heat pipes used may also vary depending on the specific implementation of the system.

An outer casing 28 surrounds the base sections 23a of the surface heat pipes 23 in the heat manifold 22. The outer casing 28 insulates the borehole heat pipe 21 and surface heat pipes 23 to prevent heat loss to the ground. The outer casing 28 of the heat manifold 22 can be made from a variety of materials, including materials that would be practical for the construction. A conductive filler material 29 is provided in the spaces between the borehole heat pipe 21, surface heat pipes 23 and outer casing 28, which aids in conducting heat from the borehole heat pipe 21 to the surface heat pipes 23. A variety of materials can serve as the conductive filler 29 in the heat manifold, including for example, metal, high conductivity cement, a fluid, or a liquid bath. The heat manifold 22 is centrally located in a heat zone to reduce energy loss to the surrounding ground during the exchange of heat from the borehole heat pipe 21 to surface heat pipes 23. The location of the heat zone where the heat manifold 22 is located can vary depending on the specific implementation. In a preferred embodiment, the heat manifold 22 is placed at a depth in the borehole sufficient to have enough contained surface area of the borehole heat pipe 21 to reduce the temperature difference between the surface heat pipes 23 and the borehole heat pipe 21 to a practical level. This is a design tradeoff between available space, material cost, and heat pipe performance.

As the vaporized contents in the borehole heat pipe 21 rise towards the colder end of the borehole heat pipe 21 near surface, the heat from the vapor is transferred to the surface heat pipes 23 and the contents of the borehole heat pipe 21 condense. The surface heat pipes 23 are configured to operate in a manner similar to the heat pipe 10 or 21. The content in a surface heat pipe 23 absorbs heat from the borehole heat pipe 21 at the base section 23a of the surface heat pipe 23, converting the contents from a liquid to a vapor. The heated vapor flows within the surface heat pipe 23 to the cooler end of the surface heat pipe 23, which is positioned in the filler layer 26 of the geothermal driveway heating system 20. The vapor condenses and releases its latent heat into the filler layer 26, and the condensed fluid flows back to the hotter end of the surface heat pipe 23, and the process repeats itself. The heat released from the surface heat pipes 23 into the filler layer 26 is transferred to the top-most layer 24 of the driveway in order to melt any precipitation forming on the top-most layer 24.

In the embodiment shown in FIGS. 2A-3B, the diameter of the borehole heat pipe 21 can be approximately three inches, the diameter of the surface heat pipes 23 can be approximately one-half inch, and the diameter of the outer casing 28 of the heat manifold 22 can be six inches. The height of the outer casing 28 of the heat manifold 22 can be approximately ten feet. The geothermal driveway heating system 20 of the present invention is not limited to these dimensions, which may vary in alternative embodiments.

The geothermal driveway heating system 20 of the present invention does not require any pumps or electric power to operate. As a result, the geothermal driveway heating system 20 is configured in a manner that provides for the melting of precipitation on a driveway without requiring energy and maintenance costs, and also does not require the supervision or presence of an individual in order for the system 20 to operate effectively.

Advantages of the geothermal driveway heating system according to the present invention include having no energy costs, eliminating snow and ice formation and damage resulting therefrom, is maintenance free and long-lasting, has no moving parts, is flexible and allows for ground movement, is completely caustic resistant and it operates continuously, so as to be self-regulating. The system operates safely in the absence of the building's owner, as there is no need for the system to be switched on and off, and it allows safe access for delivery personnel.

In another embodiment of the present invention, a geothermal roadway heating system 30a and 30b is provided. The geothermal roadway heating system 30a and 30b incorporates similar elements described previously in connection with the geothermal driveway heating system 20, but is used in conjunction with roadways.

Figure 4A:
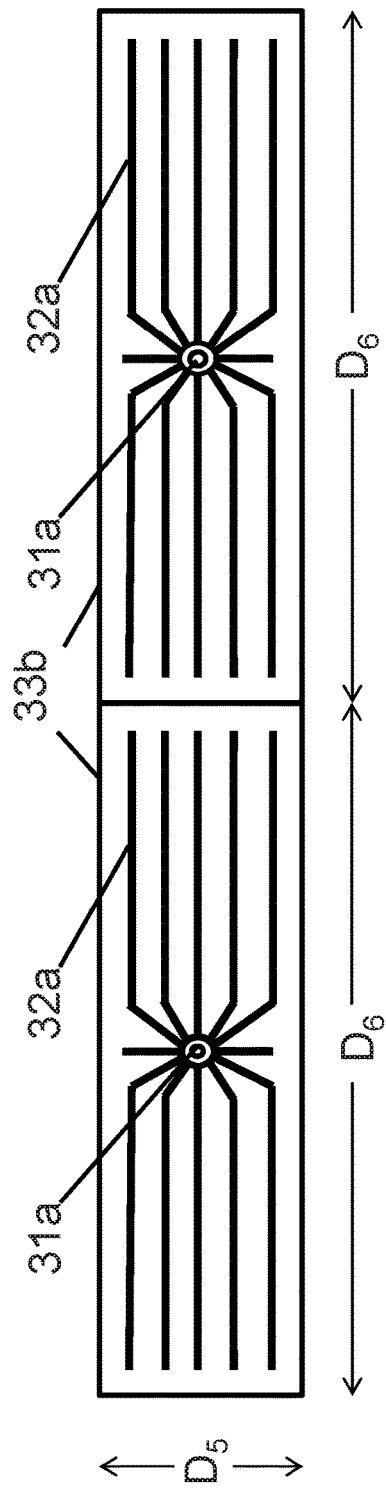
FIG. 4A shows an overhead view of a geothermal road heating system for one lane of road, in accordance with an embodiment of the present invention.

A first example of a geothermal roadway heating system 30a is shown in FIG. 4A. A borehole heat pipe 31a is inserted into a borehole in the ground. The top section of the borehole heat pipe 31a is received by a heat exchange manifold (not shown), which can be configured similarly to the heat manifold 22 of the geothermal driveway heating system 20. A plurality of surface heat pipes 32a surround the borehole heat pipe 31a in the heat manifold. At the base of the borehole heat pipe 31a, the borehole heat pipe 31a absorbs geothermal heat, and the operating fluid in the borehole heat pipe 31a converts to a vapor form. The vapor in the borehole heat pipe 31a flows to the top of the borehole heat pipe 31a, towards the heat manifold and surface heat pipes 32a, where the vapor condenses and releases latent heat to the surface heat pipes 32a. The surface heat pipes 32a transfer this heat to the roadway surface, in a manner similar to that described in reference to the systems shown in FIGS. 2A-3B.

The roadway in the geothermal roadway heating system 30a may comprise multiple layers, including a top-most layer of asphalt, which can be mixed with additive compounds to improve the heat absorption and retention properties of the asphalt, an intermediate heat conductive layer, a filler layer into which the surface heat pipes 32a are inserted and a base layer beneath the filler layer. These layers may be configured in a similar manner to the layers 24 to 27 of the geothermal driveway heating system 20.

In the embodiment of the geothermal roadway heating system 30a shown in FIG. 4A, the system 30a is configured for use in a single lane of road. The width ($D_5$) of the lane of roadway in the example shown in FIG. 4A is approximately ten feet. The geothermal roadway heating system 30a may comprise multiple segments 33a having a length ($D_6$), with each segment 33a including a borehole heat pipe 31a inserted into a borehole and a heat manifold comprising surface heat pipes 32a. In the example shown in FIG. 4A, the length ($D_6$) of each segment 33a is approximately forty feet. The system 30a may comprise several segments 33a, in order to span a particular length of roadway.

Figure 4B:
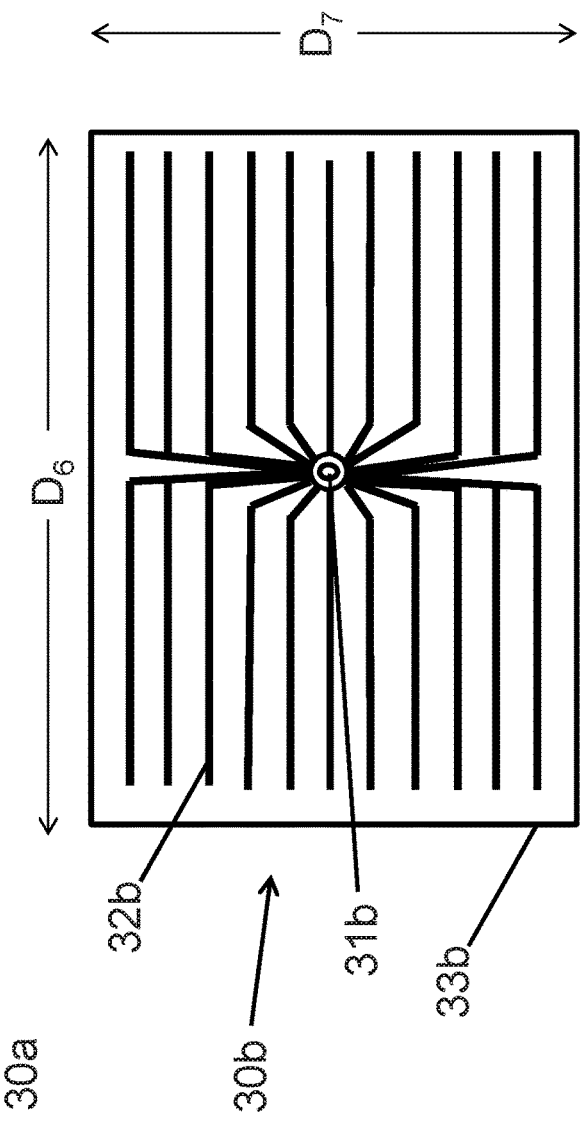
FIG. 4B shows an overhead view of a geothermal road heating system for two lanes of road, in accordance with an embodiment of the present invention.

The geothermal roadway heating system 30b may also be configured for a two-lane roadway or highway, as shown in FIG. 4B. The geothermal roadway heating system 30b comprises a borehole heat pipe 31b and surface heat pipes 32b and operates in a manner similar to the one lane geothermal roadway heating system 30a. However, the two lane geothermal roadway heating system 30b is configured for use in an area having a larger width ($D_7$) and may include a greater number of surface heat pipes 32a than in the one lane geothermal roadway heating system 30a. The width ($D_7$) of the segment 33b of the system 30b in the example shown in FIG. 4B is approximately twenty feet. The geothermal roadway heating system 30a may comprise multiple segments 33b having a length ($D_6$), with each segment 33b including a borehole heat pipe 31b inserted into a borehole and a heat manifold comprising surface heat pipes 32b. In the example shown in FIG. 4A, the length ($D_6$) of each segment 33b is approximately forty feet. The larger the configuration, the fewer number of wells is required. As more road surface heat pipes are provided to service a single borehole heat pipe, more heat is sent to the road surface per well bore. Further, as the diameter of the borehole heat pipe increases, more heat is sent to the road surface per well bore.

Although the above-described embodiments of the invention include systems for heating driveways and roadways, it is noted that in alternative embodiments, the systems of the present invention may be used to heat additional surfaces in a similar manner, including for example, sidewalks, parking lots and walkways.

In accordance with a further embodiment of the invention, a geothermal roof heating system 40 is provided, as shown in FIGS. 5A and 5B. The geothermal roof heating system 40 is configured to supply geothermal heat to the roof 46 of a structure 49, such as a house or commercial building, in order to prevent the accumulation of precipitation on the roof 46 during the winter.

In the geothermal roof heating system 40, one or more borehole heat pipes 41 are provided, which extend underground beneath the structure 49. In the embodiment shown in FIGS. 5A and 5B, two borehole heat pipes 41 are included in the system 40, with one borehole heat pipe 41 positioned on each of two opposing sides of the structure 49, extending towards the base of each sloped portion of the roof 46. In the embodiment shown in FIG. 4A, the borehole heat pipe 41 may be inserted into a borehole having a depth ($D_8$) of approximately 200 feet. During the winter or other periods of cold weather, the borehole heat pipe 41 absorbs 42 geothermal heat, as described previously herein. The heated vapor contents of the borehole heat pipe 41 travel upward towards a heat manifold (not shown), positioned at the base of the roof 46. The heated contents of the borehole heat pipe 41 transfer latent heat to a plurality of surface heat pipes 47, which are positioned around the borehole heat pipe 41 in the heat manifold. As shown in FIG. 5B, the surface heat pipes 47 extend away from the borehole heat pipe 41 in a direction towards the peak 48 of the roof 46, rather than radiating in each direction around the entire diameter of the borehole heat pipe 41, as shown for example in FIGS. 2A-4B. The extended surface heat pipes 47 may be dispersed along the width of the roof 46, as shown in FIG. 5B for example, in order to more evenly disperse heat on the roof 46.

The lengths of the surface heat pipes 47 may extend to up to several hundred feet, and the number of surface heat pipes 47 used in a particular application can vary based on the particular implementation of the system and the size of the structure 49 and roof 46.

The surface heat pipes 47 transfer heat to the roof 46 to prevent the formation and accumulation of snow and ice on the roof 46. The surface heat pipes 47 may be positioned underneath the external structure of the roof 46, so as to not be visible from the outside. Standard roofing insulation as known in the art may be used in the roof 46 in combination with the surface heat pipes 47. The borehole heat pipes 41 may also be configured within the structure 49 or the walls of the structure 49, so that the borehole heat pipes 41 are not externally visible.

As the heated contents travel upwards in the borehole heat pipes 41, heat is also released 43 to the structure 49, providing additional heat for the structure. During the summer or other warm weather periods, the borehole heat pipes 41 may operate in the opposite direction. As the atmospheric temperature above ground increases, it may be greater than the temperature of the ground surrounding the borehole for the borehole heat pipes 41. As a result, heat is released 44 into the ground during the summer and latent heat in the structure 49 is absorbed 45, to provide an additional cooling function. The operating fluid of the borehole heat pipe 41 is designed to work at the temperature of the roof 46 and of the underground portion of borehole heat pipe 41, but will still function in the travel distance in between, such that condensation may take place between the ground and the roof 46. This effect can be enhanced by fluid selection or retarded by insulation depending on the specific seasonal temperature profile of a given system.

Advantages of the geothermal roof heating system include elimination of ice dams, melting of snow and ice to prevent its accumulation and damage resulting therefrom, performing a cooling function in the summer by wicking the heat pipes, a reduction in energy usage and avoiding energy and maintenance costs.

In accordance with a further embodiment of the invention, shown in FIG. 6B, a geothermal home heating system 50b is provided.

Under the existing system 50a for using geothermal heat to heat a house or other structure 59, as shown in FIG. 6A, underground pipe 51a is installed and filled with antifreeze and absorbs 52a geothermal heat. A circulation pump 56 is provided together with a heat pump 57 to circulate the antifreeze through the pipes in order to release 53a heat into the house 59.

In accordance with the present invention, an entirely different geothermal home heating system 50b is provided. In the geothermal home heating system 50b, one or more borehole heat pipes 51b are provided, which extend underground beneath the house 59. In the embodiment shown in FIG. 6B, three borehole heat pipes 51b are included in the system 50, but this number may vary in other embodiments. In the embodiment shown in FIG. 6B, the borehole heat pipe 51b may be inserted into a borehole having a depth ($D_9$) of approximately 200 feet. During the winter or other periods of cold weather, the borehole heat pipe 51b absorbs 52b geothermal heat, as described previously herein. The heated vapor contents of the borehole heat pipe 51b travel upward towards the colder end of the borehole heat pipe 51b positioned in a heat exchanger 58, which may be positioned on a side of the house 59. Heat from the borehole heat pipes 51b is transferred to the heat exchanger 58, which provides 53b the heat to the house 59. The heat exchanger 58 is the device used to send the heat from an evaporation section of the borehole heat pipe 51b to the environment, such as the inside of the house 59, or in warm weather periods, to take environmental heat and transfer it to the condensing section of the borehole heat pipe 51b.

During the summer or other warm weather periods, the borehole heat pipes 51b may operate in the opposite direction. As the atmospheric temperature above ground increases, it may be greater than the temperature of the ground surrounding the borehole for the borehole heat pipes 51b. As a result, heat is released 54b into the ground from the borehole heat pipes 51b during the summer and latent heat in the structure 59 is absorbed 55b by the borehole heat pipes 51b through the heat exchanger 58, to provide an additional cooling function to the interior of structure 59. The circulation of the working fluid naturally reverses direction as the temperature difference between the ends of the borehole heat pipe 51b reverses polarity. In accordance with the present invention, the reversal of direction occurs naturally, without requiring a pump to change the fluid flow direction, or the significant power input to operate a pump.

Advantages of the geothermal home heating system of the present invention include eliminating the circulating pump and the energy usage it requires, perform a cooling function in the summer by wicking the heat pipes.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed:

1. A system for providing geothermal heat to an outdoor surface, comprising:
   at least one borehole heat pipe inserted into a borehole, the at least one borehole heat pipe comprising:
      a vacuum sealed container comprising an operating fluid;
      a first end comprising an evaporation section; and
      a second end comprising a condensation section;
      wherein the evaporation section of the at least one borehole heat pipe is configured to absorb geothermal heat and convert the operating fluid from liquid to vapor, such that the vapor flows to the second end of the borehole heat pipe, and wherein the condensation section is configured to release the geothermal heat from the vapor and convert the operating fluid from vapor to liquid; and
   a plurality of surface heat pipes each having a base section and a heat transfer section, wherein the base sections of the plurality of surface heat pipes surround the second end of the borehole heat pipe and are configured to absorb the geothermal heat released by the condensation section of the at least one borehole heat pipe, and the heat transfer sections are positioned beneath the outdoor surface and configured to transfer the geothermal heat to the outdoor surface;
   wherein each of the plurality of surface heat pipes comprises:
   a further vacuum sealed container comprising a further operating fluid;
   a first end in the base section comprising an evaporation section; and
   a second end in the heat transfer section comprising a condensation section,
   wherein the evaporation section of each of the plurality of surface heat pipes is configured to absorb geothermal heat from the at least one borehole heat pipe and convert the further operating fluid from liquid to vapor, such that the vapor flows to the second end of the each of the plurality of surface heat pipes, and wherein the condensation section of each of the plurality of surface heat pipes is configured to release the geothermal heat from the vapor and convert the further operating fluid from vapor to liquid.

2. The system according to claim 1, further comprising:
   a heat manifold comprising an outer casing that surrounds the base sections of the plurality of surface heat pipes and the second end of the at least one borehole heat pipe.

3. The system according to claim 2, wherein the heat manifold further comprises a conductive material filling spaces between the outer casing, the plurality of surface heat pipes and the at least one borehole heat pipe.

4. The system according to claim 2, wherein the outdoor surface comprises an asphalt or concrete layer comprising asphalt or concrete combined with at least one additional material configured to increase the heat retention ability of the asphalt or concrete.

5. The system according to claim 4, further comprising:
   wherein the heat transfer sections of the plurality of surface heat pipes are positioned in a filler layer beneath the asphalt or concrete layer and comprising one or more materials having heat conductive properties, wherein the filler layer is configured to transfer heat from the plurality of surface heat pipes to the asphalt or concrete layer of the outdoor surface.

6. The system according to claim 5, further comprising:
   an intermediate level formed of a heat conductive concrete material positioned in between the filler layer and the asphalt or concrete layer, and
   a base layer formed of concrete positioned beneath the filler layer.

7. The system according to claim 1, wherein the heat transfer sections of the plurality of surface heat pipes project away from the at least one borehole heat pipe in a plurality of directions around the at least one borehole heat pipe.

8. The system according to claim 1, wherein the borehole has a depth of between 200 and 300 feet.

9. The system according to claim 1, wherein the outdoor surface is a road.

10. The system according to claim 1, wherein the outdoor surface is a driveway.

11. The system according to claim 1, wherein the outdoor surface is a roof of a structure.

12. The system according to claim 11, further comprising:
   a second borehole heat pipe inserted into a second borehole, the second borehole heat pipe comprising:
   a second borehole heat pipe vacuum sealed container comprising a second borehole heat pipe operating fluid,
   a first end of the second borehole heat pipe comprising an evaporation section of the second borehole heat pipe, and
   a second end second borehole heat pipe comprising a condensation section second borehole heat pipe,
   wherein the evaporation section of the second borehole heat pipe is configured to absorb geothermal heat and convert the second borehole heat pipe operating fluid from liquid to vapor, such that the vapor flows to the second end of the second borehole heat pipe, and wherein the condensation section second borehole heat pipe is configured to release the geothermal heat from the vapor and convert the second borehole heat pipe operating fluid from vapor to liquid; and
   a second plurality of surface heat pipes each having a base section and a heat transfer section, wherein the base sections of the second plurality of surface heat pipes surround the second end of the second borehole heat pipe and are configured to absorb the geothermal heat released by the condensation section of the second borehole heat pipe, and the heat transfer sections are positioned beneath the outdoor surface and configured to transfer the geothermal heat to the outdoor surface.

13. The system according to claim 12, wherein the outdoor surface is a roof of a structure.

14. The system according to claim 13, wherein the first borehole heat pipe and second pipe are positioned on opposing sides of the structure and the heat transfer sections of the first and second plurality of surface heat pipes are placed beneath an exterior surface of the roof and extend towards a center of the roof.

* * * * *